W. J. PHELPS.
DETINNING TIN SCRAP.
APPLICATION FILED JUNE 19, 1914.
1,202,886.
Patented Oct. 31, 1916.
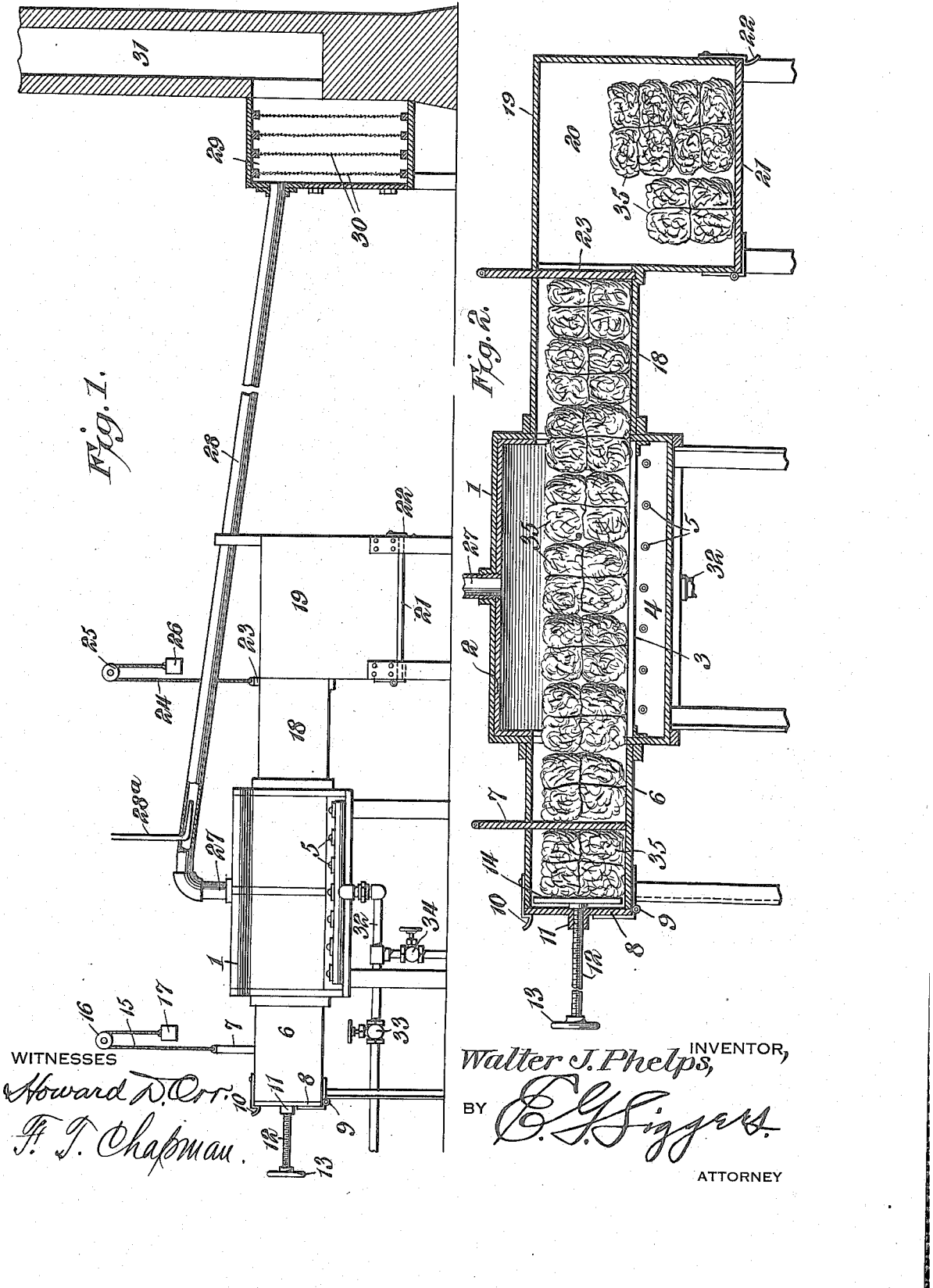
WITNESSES
Howard D. Orr
F. T. Chapman
INVENTOR,
Walter J. Phelps,
BY E. G. Siggers.
ATTORNEY

UNITED STATES PATENT OFFICE.

WALTER J. PHELPS, OF BALTIMORE, MARYLAND, ASSIGNOR TO PHELPS CAN COMPANY, OF WEIRTON, WEST VIRGINIA, A CORPORATION OF WEST VIRGINIA.

DETINNING TIN-SCRAP.

1,202,886.

Specification of Letters Patent.   Patented Oct. 31, 1916.

Application filed June 19, 1914.   Serial No. 846,183.

*To all whom it may concern:*

Be it known that I, WALTER J. PHELPS, a citizen of the United States, residing at Baltimore, State of Maryland, have invented a new and useful Improvement in Detinning Tin-Scrap, of which the following is a specification.

This invention has reference to improvements in detinning tin scrap, and while intended more particularly for removing the tin coating from the basic material, iron or steel, it may be employed for removing lead or zinc from like scrap, for which reason the word tin as hereinafter employed throughout the specification is to be understood as including other metals of similar character.

In certain industries utilizing sheet tin, as, for instance, in the manufacture of tin cans, there is a considerable waste, since the tin sheets come in standard sizes, and from such sheets pieces of different shapes are cut, while the parts not utilizable accumulate as scrap, and have no value other than the scrap value, which is much less than the original cost of the material in the form of sheets.

The tin values present in the scrap represent in themselves very material values, and while steel sheets upon which the tin coating is produced have a much less value than the tin, they also represent a material value. The scrap value of scrap tin is at present below the value of the steel included in the scrap.

It has heretofore been a matter of considerable expense to recover the tin from the scrap, so that the presence of the tin does not add to the market value of the scrap which is largely used for the production of sash weights and other like devices where the brittleness caused by the presence of tin and other ingredients is not material.

It is the object of the present invention to provide a relatively cheap and efficient means for the separation and recovery of the tin from tin scrap, and at the same time leaving the steel in such condition as to be utilizable for remelting at a material increase in value over the present value of tin scrap.

By the present invention the tin scrap is introduced into a furnace chamber or other suitable inclosure protecting against free access of the atmosphere and in such inclosure the tin scrap is subjected to a heat sufficient to cause the tin to oxidize and volatilize, such heat being that at which iron is at a low red, usually known as about cherry red. The heating is carried on in the presence of a minimum amount of air so as to prevent oxidization of the steel. The fumes are carried from the heating zone into a flue where air may be admitted to insure oxidation of all of the tin and from thence the fumes are caused to travel for a suitable distance to cause the fumes to cool sufficiently so that the tin oxid may be collected in any of a variety of ways, one simple way being to pass the condensed matters which are then in the form of tin oxid dust, through fine fabric. This collects the tin oxid while the cool products of combustion may pass to a suitable flue or other means of creating the draft through the structure. The products of combustion may still be sensibly hot for the term cool is used only relatively, meaning that the temperature of the gases has dropped sufficient to permit the condensation of the volatilized tin or tin oxid.

A suitable apparatus for the purpose may consist of a furnace inclosure having a feeding end with a cut-off and door, whereby a bundle of tin scrap may be introduced through an opening unclosed by the door, while the cut-off is in the closed position, after which the door may be closed, the cut-off moved out of the way, and the bundle forced by suitable means into the furnace. Heat is produced in any suitable way, as by a battery of gas burners, and while the bundles of scrap are being slowly forced through the furnace the heat ultimately volatilizes the tin which escapes from the bundles in the form of vapor or gas and passes from the furnace by means of a suitable flue or conduit, to be afterward condensed and collected. By the provision of a cut-off and receptacle at the discharge end of the furnace, the detinned bundles may be discharged from time to time and at suitable intervals removed from the receptacle, being then cool enough to prevent quick oxidization from contact with the air. Throughout the heating of the scrap care is taken to avoid the entrance of such an amount of air as to materially oxidize the steel, wherefore it is found in practice that the steel is thoroughly detinned and markedly free from oxid.

The invention will be best understood from a consideration of the following detailed description, taken in connection with the accompanying drawings forming a part of this specification, with the further understanding that while the drawings show a practical apparatus for practising the invention the latter is not confined to any strict conformity with the showing of the drawings, but the apparatus may be changed and modified so long as such changes and modifications mark no material departure from the salient features of the invention.

In the drawings: Figure 1 is a side elevation with some parts in section of a detinning apparatus. Fig. 2 is a longitudinal vertical section of the furnace portion of the detinning apparatus.

In the drawings there is shown a furnace 1 which may be in the general form of a steel box with an interior lining 2 of refractory material. Near the bottom of the box there is a grid 3 below which is a fire chamber 4 entered by a battery of burners 5 which may be taken as gas burners of known type, but it will be understood that any suitable furnace and any suitable means for producing heat may be utilized in the present invention.

At one end of the furnace, which latter may be somewhat elongated, there is an entering duct 6 which at some convenient point intermediate of its length is traversed by a sliding gate 7. The end of the duct 6 remote from the furnace is provided with a door 8 which may be carried by hinges 9 to readily open, and a latch 10 in position to engage the edge of the door remote from the hinges serves to hold the door closed. The door is provided with a central threaded boss 11 traversed by a threaded stem 12 having a manipulating wheel 13 at its outer end and a follower 14, which, when the door is closed, is lodged inside of the duct on the door side of the slide or gate 7. In order to facilitate the operation of the gate 7 it is hung by a flexible strand 15 which may pass over a pulley 16 and carry at the end remote from the gate or slide a counterweight 17.

At the end of the furnace remote from the duct 6 is another duct 18 in line with the duct 6, and on a level with the grid 3. The duct 18 at the end remote from the furnace opens into a casing 19 inclosing a chamber 20 of appropriate size, and this chamber may have its bottom portion in the form of a door 21 held normally closed by a latch 22, so that from time to time the door 21 may be opened, permitting any materials lodged in the chamber to gravitate therefrom. The duct 18 is normally separated from the chamber 20 by a slide or gate 23 carried by a flexible strand 24 passing over a pulley 25 and provided at the end remote from the slide with a counterweight 26 facilitating the operation of the slide. When the slide or gate 23 is in traversing relation to the duct 18 it effectively cuts off communication between the duct and the chamber 20.

Rising from the top of the furnace is a pipe 27 having a prolonged continuation 28 which may if desired slant downwardly from the upper end of the pipe 27, and this pipe 28 is of appropriate length ultimately opening into a collecting chamber 29 in which are lodged sheets 30 of suitable fabric capable of screening out any dust or fine particles carried by gases entering it from the pipe 28. The chamber 29 at the end remote from the pipe 28 opens into a flue 31 by which the gases of combustion are carried off, and this flue serves as a convenient means for producing a draft. An air pipe 28$^a$ enters the prolongation 28 near its receiving end so as to supply air to oxidize any volatilized tin that may be present, free oxygen being excluded from the furnace so far as may be in order to avoid oxidization of the steel in the furnace. Suitable piping 32 with controlling valves 33, 34 leads to the burners 5, but requires no description since all these parts may follow the usual practice in heating furnaces where gas may be the fuel.

In utilizing the furnace it is desirable that the tin scrap be compacted into bundles, these bundles being shown at 35 in Fig. 2. To introduce the bundles into the furnace the slide or gate 7 is closed and the door 8 is opened. A bundle is introduced into the duct 6 through the end unclosed by the door 8, and the door is subsequently closed and latched, after which the gate 7 is moved out of the way and the hand wheel 13 is manipulated to cause the follower 14 to push the introduced bundle of scrap toward the interior of the furnace 1.

If it be assumed that the furnace is occupied by a row of bundles 35 and that the burners are working properly, the bundles of scrap become subjected to the heat produced by the burners, and further assuming that this heat is properly regulated, the bundles of scrap become raised to a cherry red heat, or thereabout, but sufficient to cause oxidation of the tin and its volatilization without melting the steel. From time to time additional bundles are introduced into the duct 6, the gate 23 being opened as necessary to permit the ejection of bundles, which have already passed through the furnace, into the chamber 20, and this chamber may be of considerable capacity, and may hold quite a number of bundles at one time, thus giving the bundles an opportunity to cool off before being subjected to contact with the atmosphere.

The volatilized material passes into the pipe 27 and from thence into the continuation 28 where any unoxidized tin is oxidized by air entering by the pipe 28$^a$, and the continuation 28 may be of a length permitting the gases of combustion with the tin oxid vapors to cool off sufficiently to condense the tin oxid which may be present. The tin oxid is deposited in dust-like form and on reaching the separating chamber 29 is arrested by the screens 30, falling to the bottom of the chamber and clinging to the screens, and from time to time the deposit may be removed, any oxid deposited in the pipe continuation 28 being removed by a suitable scraper. By this means the tin scrap is thoroughly detinned and the tin is recovered in condition for further treatment for the return of the tin to metallic tin, or the utilization of the oxid for any other purpose. The bundles of steel removed from the chamber 20 are markedly free from tin and may be readily remelted into workable form.

The process is in effect a continuous process, that is, bundles of tin scrap are introduced as often as necessary into the furnace, forcing those already introduced through the furnace as rapidly as fresh bundles are inserted, and the detinned bundles drop out, the speed being regulated in accordance with the heat employed and the size of the bundles. While the heat may vary somewhat, a low or cherry red heat is found to answer the purposes of the invention, while too high a heat may be found to be detrimental. The gates 7 and 23 permit the introduction of fresh bundles into the furnace and the removal of the treated bundles with a minimum influx of air, so that little if any oxidization of the steel results.

By the employment of a gas inert to tin, as would occur where practically perfect combustion is had at the burners, and a negligible amount of air enters with the introduced bundles, or by exhausting the heating chamber, in which latter case the gases of combustion must be excluded and the bundles heated by conduction only, oxidization of either the tin or the steel may for all practical purposes be wholly avoided. Of course, other metals, like lead or zinc, may be recovered in similar manner to the recovery of tin with a cleansing of the basic material, usually steel, so that such basic material is in good commercial condition for further treatment, and is salable at a good price as compared with the scrap price of the untreated material.

What is claimed is:—

1. The method of detinning tinned steel plate, which consists in subjecting the tinned plate in a chamber protected from ready access of the atmosphere to a temperature high enough to cause oxidization and volatilization of the tin in the presence of air but less than the melting point of steel, and conducting the volatilized material from the neighborhood of the detinned steel.

2. The method of detinning tin scrap, which consists in subjecting the scrap in masses and while contained in a chamber protected from free access of the atmosphere, to a temperature causing the tin to oxidize and volatilize, but less than the melting point of steel, and conducting the volatilized material away from the neighborhood of the detinned scrap.

3. The method of treating tin scrap for the separate recovery of both the tin and the steel therefrom, which consists in driving off the tin by heat from the steel base in an atmosphere containing oxygen but sufficiently deficient therein to prevent material oxidization of the steel base, and cooling the detinned steel in an atmosphere substantially free from oxygen.

4. The method of recovering tin and steel from tin scrap, which consists in heating the scrap in a chamber protected from free access of the atmosphere to a temperature causing the tin to oxidize and volatilize, conducting the volatilized material away from the neighborhood of the detinned steel, cooling such volatilized material, and cooling the detinned steel while protected from access of the atmosphere.

5. The method of removing the tin coating from tin plate, which consists in heating the tin plate to substantially a cherry red heat until the tin is oxidized and volatilized, conducting the volatilized material away from the neighborhood of the detinned steel and cooling the latter while protected from access of the atmosphere.

6. The method of detinning tin scrap, which consists in heating the scrap to a temperature causing the tin to oxidize and volatilize while contained in a chamber substantially closed against admission of air, conducting the volatilized material away from the neighborhood of the detinned steel, admitting air to the volatilized material after leaving the chamber, protecting the detinned steel from access of the atmosphere until said steel is cooled, and recovering the tin oxid by condensation and separation.

7. The method of removing tin from tin plate for the recovery of both the tin and the steel constituting the tin plate, which consists in driving off the tin by heat at a temperature less than the melting point of steel and in an atmosphere containing oxygen but sufficiently deficient therein to prevent material oxidization of the detinned steel.

8. The method of recovering the tin and steel values from tin scrap which consists in causing the tin scrap to traverse a heating zone protected from free access of the atmosphere and there subjecting the tin scrap to a temperature sufficient to cause the tin to oxidize and volatilize, conducting the volatilized material from the neighborhood of the heating chamber and cooling said volatilized material, and directing the steel denuded of tin to a cooling zone while still protected from access of the atmosphere.

9. The method of recovering tin and steel values from tin scrap which consists in forming the steel scrap into bundles, causing the bundles of scrap to progressively move through a heating zone from which free access of air is prevented and there raising the tin scrap to substantially cherry red heat and maintaining it at such heat for a length of time to cause the tin to oxidize and volatilize, conducting the volatilized material from the neighborhood of the denuded steel and recovering the volatilized material, and cooling the denuded steel while still protected from access to the atmosphere.

10. An apparatus for the treatment of tin scrap to recover the tin and steel values, comprising a heating furnace having an entering end with spaced means for the introduction of the scrap, and the exclusion of the atmosphere, an exit end provided with means for the disposition of scrap denuded of tin without access of the atmosphere, and means for conducting volatilized material away from the heating chamber.

11. An apparatus for the treatment of tin scrap to recover the tin and steel values, comprising a heating furnace having an entering end with spaced means for the introduction of the scrap, and the exclusion of the atmosphere, an exit end provided with means for the disposition of scrap denuded of tin without access of the atmosphere, and means for conducting volatilized material away from the heating chamber, the last-named means being also provided with means for the recovery of the volatilized material.

12. An apparatus for the recovery of tin and steel values from tin scrap, comprising a heating furnace having an entering end with spaced means for the introduction of the tin scrap and the exclusion of the atmosphere, other spaced means at the exit end of the furnace with an otherwise closed chamber between the spaced means for the reception of detinned steel scrap in a substantially non-oxidizing atmosphere, and a duct leading from the furnace for the removal of volatilized tin therefrom of a length to provide for the deposition and recovery of the material containing tin values.

In testimony, that I claim the foregoing as my own, I have hereto affixed my signature in the presence of two witnesses.

WALTER J. PHELPS.

Witnesses:
  JOHN H. SIGGERS,
  E. G. SIGGERS.